United States Patent [19]

Tseng et al.

[11] Patent Number: 4,460,315
[45] Date of Patent: Jul. 17, 1984

[54] TURBOMACHINE ROTOR ASSEMBLY

[75] Inventors: Wu-Yang Tseng, West Chester; Bruno G. Lampsat, Cincinnati, both of Ohio

[73] Assignee: General Electric Company, Cincinnati, Ohio

[21] Appl. No.: 278,923

[22] Filed: Jun. 29, 1981

[51] Int. Cl.³ .............................................. F01D 5/30
[52] U.S. Cl. ................................ 416/216; 416/219 R; 416/237
[58] Field of Search .............. 416/215, 216, 217, 218, 416/219, 201 R, 198 A, 212, 237

[56] References Cited

U.S. PATENT DOCUMENTS

| 952,317 | 3/1910 | Eyermann | 416/218 |
| 1,640,451 | 8/1927 | Junggren | 416/215 |
| 2,821,357 | 1/1958 | Schörner | 416/217 |
| 2,833,463 | 5/1958 | Morley | 416/215 |

FOREIGN PATENT DOCUMENTS 1012927 8/1957 Fed. Rep. of Germany ...... 416/219

Primary Examiner—Harvey C. Hornsby
Assistant Examiner—T. W. Epting
Attorney, Agent, or Firm—Francis L. Conte; Derek P. Lawrence

[57] ABSTRACT

According to the present invention, there is provided a turbomachine rotor assembly having a blade mounting means comprising a rotor spool defining a flowpath surface and having at least one circumferential dovetail shaped retaining groove therein. A plurality of radially extending blade members each comprising a dovetail root are positioned in the retaining groove of the rotor spool. The root comprises a pair of axially oppositely extending asymmetric shoulders having radially outwardly facing and differentially radially spaced contact surfaces for mating with complementary surfaces of the retaining groove of the rotor spool.

14 Claims, 3 Drawing Figures

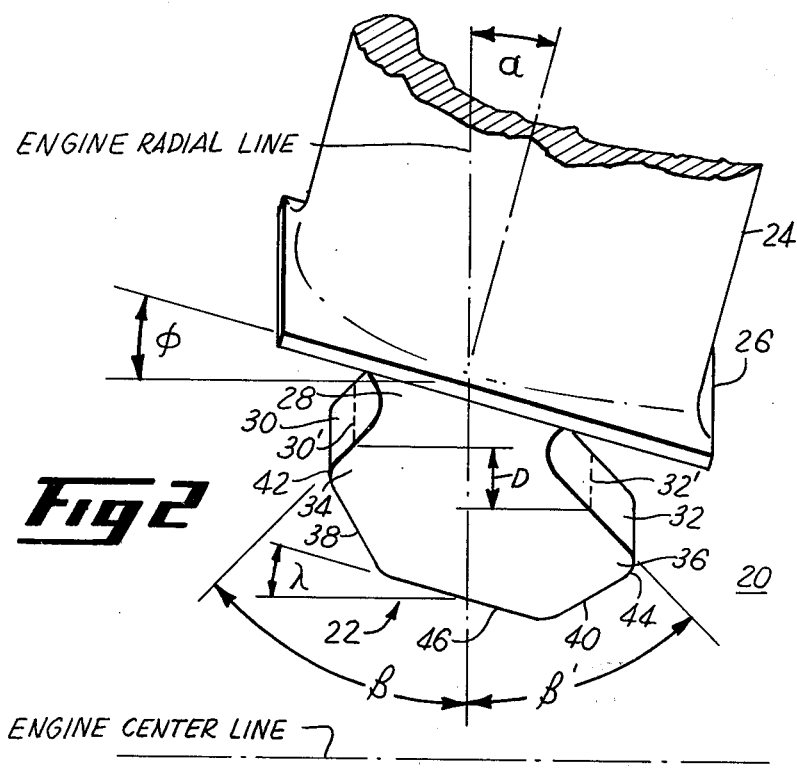
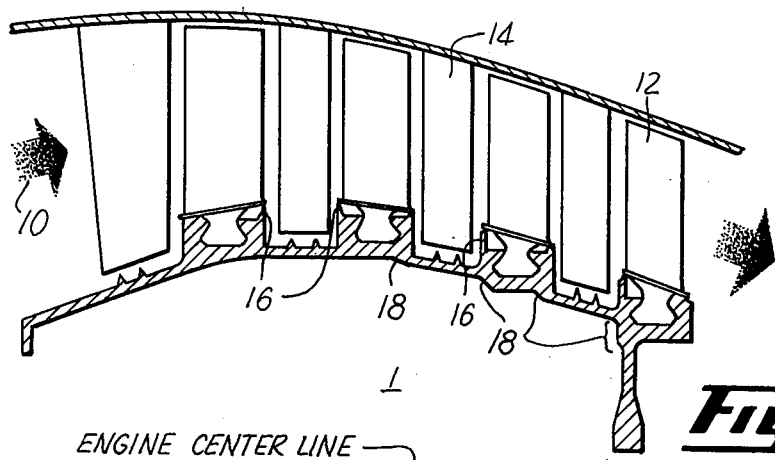
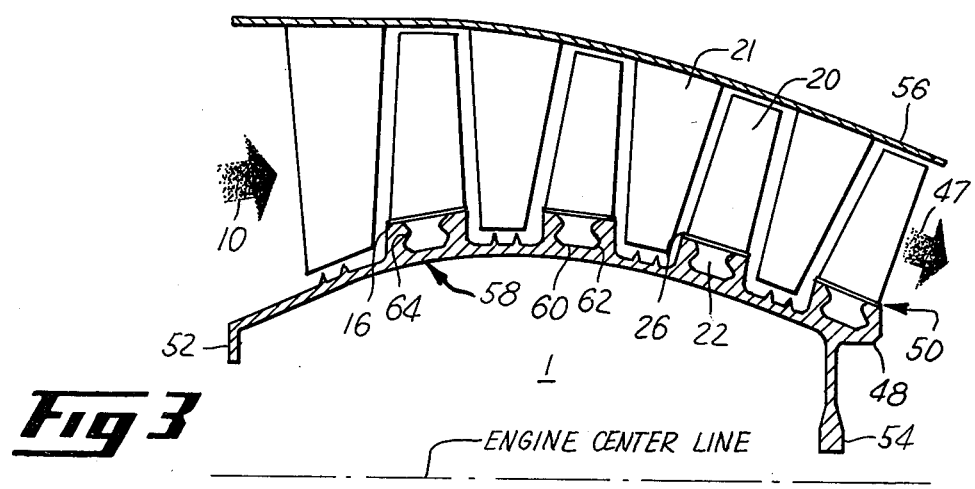

TURBOMACHINE ROTOR ASSEMBLY

BACKGROUND OF THE INVENTION

This invention relates to turbomachine rotor assemblies and more particularly to blade mounting arrangements for fastening blades such as compressor and turbine blades to rotor spools in such assemblies. The blade mounting arrangement of the present invention is particularly useful in applications such as gas turbine engines having circumferential dovetail and rotor spool groove constructions.

A common rotor structure used in axial flow gas turbine engines includes a relatively thin drum or rotor spool having a surface which, in part, is radially sloped outwardly with respect to the longitudinal axis of the turbine and defines an annular fluid flowpath within the turbine, and a plurality of airfoil blade members secured to the spool in circumferential rows. The flowpath is further defined by an outer turbine flowpath wall which often includes a portion which is also radially sloped outwardly with respect to the longitudinal turbine axis. The angle of the slope of the outer flowpath wall can exceed approximately 15 to 20 degrees.

Typically, compressor and turbine blade rows, and the stator vane rows therebetween, are oriented in the turbine section and/or compressor section of an axial flow turbomachine with their longitudinal axes extending substantially perpendicular to the longitudinal turbine axis. The high slope of the outer flowpath wall forms an acute angle with respect to the blade tips resulting in the fluid flow stream lines impinging the blade tips at an acute angle. This arrangement results in blade tip aerodynamic losses due to flow turbulence which result in reduced efficiency of the turbine and compressor sections.

One arrangement for improving the blade aerodynamic efficiency comprises blades and vanes uniformly tilted to the flow such that the blades and vanes are oriented more closely normal to the flow stream lines. This tilted blade arrangement can be utilized in both the compressor section and/or the turbine section of a turbomachine. For example, the use of a tilted blade arrangement as used in a turbine section of an axial flow gas turbine engine is disclosed and claimed in a related application, "Turbine Arrangement", Ser. No. 13DV-7749, assigned to the assignee of the present invention, and is incorporated herein by reference. The use of a tilted turbine blade and vane arrangement has the effect of reducing the blade tip losses, thus providing an aerodynamically improved turbine structure. However, by tilting the rotating turbine blades, a centrifugal bending force is created which acts on the blades resulting in additional forces at the blade mounts thereof.

One type of conventional blade mount for retaining blade members in the rotor spool includes a platform formed integral with the base of an airfoil and positioned substantially parallel to the contour surface of the rotor spool, and a root or dovetail formed integral with the platform, which dovetail includes a necked-in portion defining a pair of oppositely laterally extending, radially symmetric dovetail shoulders or teeth. The lower surface or base of the dovetail is substantially aligned parallel to the longitudinal axis or centerline of the turbine.

The dovetails are secured in generally aerodynamically non-functional blade-supporting structures such as thickened annular rotor spool portions having circumferential grooves formed therein for mating with the dovetails, and which grooves are effective to secure the blade dovetails to restrain the blades from moving radially out of the rotor. Assembly of the blade dovetails into the blade-retaining grooves is ordinarily accomplished by inserting a blade dovetail through a narrow loading slot cut into the groove at one or more discrete points along the circumference of the spool and then sliding the blades in the blade-retaining grooves into their respective positions.

The use of a blade having a conventional type dovetail root with a tilted platform in a sloped rotor spool requires additional material in the rotor spool. More specifically, circumferential fluid seal portions or radial extensions of the rotor spool to the blade platforms are required on both sides of the circumferential dovetail grooves for restricting the leakage of turbine fluid past the dovetail grooves. Due to the fact that the blade dovetail is symmetric, extends in the radial turbine axis and intersects the generally tilted platform at an acute angle, one of the mentioned fluid seal portions is radially longer than the other which results in excess rotor spool weight.

Additionally, due to the fact that the base of the dovetail is generally aligned parallel to the turbine longitudinal axis and the rotor spool contour is sloped with respect thereto, the rotor spool generally includes transition corners or steps which are sufficiently sturdy for accommodating the centrifugal forces acting on the blades and transferred to the rotor spool. The formation of fluid seal portions and transition corners require more complex machining of the rotor spool resulting in a heavier rotor spool having a less aerodynamically smooth contour.

During operation, when the rotor spool and blades are rotating, centrifugal forces acting on the rotating blades are transferred to the rotor spool through the blade dovetail. Accordingly, contact forces exist between the radially outer contact surfaces of the dovetail shoulders or teeth and the corresponding contact surfaces of the circumferential grooves in the rotor spool.

In typical turbine engines, the longitudinal axis of a rotating blade extends generally parallel to a radial line or axis of the turbine. This arrangement results in approximately equal contact forces being exerted on both teeth of the dovetail teeth pair. However, in tilted turbine blade design, the longitudinal axis of the blade is inclined relative to the radial axis of the turbine which results in the generation of a centrifugally induced bending force being applied to the blade dovetail. This bending force, when acting on the pair of dovetail teeth, increases the contact force on one tooth and decreases the contact force on the other tooth.

Due to the fact that the contact force between the one tooth and its corresponding contact surface in the rotor spool groove is reduced, it is possible that the contact force approaches a zero magnitude. Where a contact force is appreciably low or substantially zero in magnitude, chatter of the dovetail within its groove can result. Chatter is the vibratory loss of contact of the dovetail tooth within its rotor spool groove due to excitation forces existing in the gas turbine engine acting on the blade. When chatter occurs, the dovetail is more subject to high cycle fatigue failure. The chattering or pounding of a dovetail tooth against its circumferential groove can quickly lead to the failure of any protective high cycle fatigue reducing coatings that may be provided on the dovetail and also can lead to initiation of dovetail cracks. Once cracks form in the dovetail, high cycle fatigue failure of the dovetail can quickly occur.

Another disadvantage which results from having axially tilted rotating blades, is the increased total force which the blade mounting means must accommodate due to the additional centrifugal bending force generated. More specifically, not only do the centrifugal forces acting on an axially tilted rotating blade create tensile loads on the blade and dovetail, but bending loads are additionally created due to the moment arm created by utilizing tilted blades. Higher dovetail loading leads to higher stresses therein which must be accommodated, generally by increasing the size of the dovetail and the corresponding rotor spool groove area.

To use conventional type dovetails for axially tilted rotating blades requires a larger than normal dovetail design to accommodate the increased forces therein. Furthermore, the rotor spool in which the dovetail is located must also be made more sturdy for accommodating the increased forces. A sturdier rotor spool generally increases the weight of the turbine and generally does not increase the aerodynamic efficiency thereof. In fact, a rotor spool designed for accommodating tilted blades having conventional dovetails can actually result in increased losses in aerodynamic efficiency therefrom. In addition to the increase in weight of the rotor and dovetail, the complexity of the machining required for fabricating the structure is increased.

SUMMARY OF THE INVENTION

Accordingly, an object of this invention is to provide a new and improved turbomachine rotor assembly having new and improved blade mounting means for maintaining dovetail contact forces and avoiding dovetail chatter.

Another object of this invention is to provide new and improved blade mounting means for tilted blades effective for decreasing total dovetail contact forces and decreasing the centrifugally induced bending component of the dovetail contact forces.

Another object of this invention is to provide new and improved blade mounting means enabling the use of smaller and lighter dovetails.

Another object of this invention is to provide new and improved blade mounting means comprising a lightweight rotor construction having a minimum of aerodynamically non-functional blade supporting structures.

According to one form of the present invention, there is provided a turbomachine rotor assembly having a blade mounting means comprising a rotor spool defining a flowpath surface and having at least one circumferential dovetail shaped retaining groove therein. A plurality of radially extending blade members each comprising a dovetail root are positioned in the retaining groove of the rotor spool. The root comprises a pair of axially oppositely extending asymmetric shoulders having radially outwardly facing and differentially radially spaced contact surfaces for mating with complementary surfaces of the retaining groove of the rotor spool.

DESCRIPTION OF THE DRAWING

The invention together with further objects and advantages thereof, is more particularly described in the following detailed description taken in conjunction with the accompanying drawing in which:

FIG. 1 is a fragmentary sectional view of a prior art multistage axial flow turbomachine having conventional blade mounting means.

FIG. 2 is a fragmentary three-dimensional view of the skew dovetail of the present invention.

FIG. 3 is a sectional view of the turbomachine rotor assembly of the present invention.

DETAILED DESCRIPTION

Shown in FIG. 1 is a multistage turbomachine rotor assembly 1, such as a compressor section of an axial flow gas turbine engine, having prior art type blade mounting means as above-described. It is readily apparent therefrom that the flow streamlines of turbine intake air 10 impinges blades 12 and vanes 14 at an acute angle with respect to their longitudinal axes prior to leaving the compressor. Fluid seal portions 16 and transitional corners 18 as above-mentioned are also clearly shown.

FIG. 2 illustrates a portion of a blade 20 comprising a skew dovetail 22 constructed according to the present invention. Dovetail 22 is effective for reducing the disadvantages associated with the use of conventional dovetails shown in FIG. 1 and discussed above.

As illustrated in FIG. 2, the blade 20 further comprises an airfoil portion 24 tilted at an angle $\alpha$ from an engine radial line or axis and smoothly flared at one end into a generally rectangular platform 26 disposed between the dovetail 22 and airfoil 24. In the overall assembly as shown in FIG. 3, the dovetail 22 is aligned substantially parallel to the engine radial axis, and platform 26 is aligned at an angle $\phi$ from the engine longitudinal axis or centerline. The angle $\phi$ can be substantial and, for example, in the range of approximately 15 to 20 degrees.

Dovetail 22 comprises a laterally necked-in portion 28 extending radially inwardly from platform 26 and flares laterally outwardly and radially inwardly for defining radially upper contact surfaces 30 and 32 of two oppositely laterally projecting asymmetric dovetail teeth or shoulder portions 34 and 36, respectively, which extend axially and oppositely in the direction of the leading and trailing edges of the airfoil portion 24. Dovetail teeth 34 and 36 are generally triangular and further comprise radially lower surfaces 38 and 40 joining contact surfaces 30 and 32 at curvilinear transitional corners 42 and 44, respectively, and extending radially and laterally inwardly to a flat base surface 46 of dovetail 22. Radially upper contact surfaces 30 and 32 are each aligned at an angle $\beta$ and $\beta'$, respectively, from the engine radial axis, which angles are equal in value but opposite in slope, and base surface 46 is aligned generally at an angle $\lambda$ from the engine centerline.

Dovetail 22 includes a longitudinal axis which coincides with the engine radial line and is equidistant two circumferentially extending resultant force contact lines of contact surfaces 30 and 32 and indicated by dash lines 30' and 32', respectively. In conventional type dovetail construction, dovetail teeth 34 and 36 would be symmetric with respect to the dovetail longitudinal axis and the two resultant force contact lines 30' and 32' would be located equally radially outwardly from the turbine centerline. Thus, if conventional radially extending airfoils were used in a turbomachine rotor assembly, the resultant contact forces on the dovetail teeth pair would be substantially equal. However, where axially tilted airfoils are used, the resultant contact forces on the dovetail teeth pair are generally unequal.

In accordance with the present invention and in order to reduce and make more equal the resultant contact forces, the resultant force contact lines 30' and 32', and accordingly the contact surfaces 30 and 32, are displaced radially from each other, a distance D, resulting in a skew or asymmetric dovetail. The distance D is proportional to the degree of axial tilt of the airfoil 24, i.e., no spacing in stages having no axial tilt, and maximum spacing in those stages have maximum tilt. Accordingly, dovetail tooth 36, which is located on that side of airfoil 24 which is tilted axially away from the engine radial line, is predeterminedly radially displaced inwardly relative to dovetail tooth 34. Due to the fact that dovetail teeth 34 and 36 are radially relatively displaced, the components of contact forces resulting from the bending forces acting on dovetail 22 are less than those which would occur in conventional symmetric dovetails. It has been determined that for obtaining reduced components of bending contact forces on dovetail teeth 34 and 36, angles $\beta$ and $\beta'$ should be preferably equal in magnitude and in the range of approximately 40 to approximately 55 degrees. More specifically, angles $\beta$ and $\beta'$ are preferably approximately 45 degrees in magnitude and opposite in slope.

The radial thicknesses of dovetail teeth 34 and 36 are determined with the use of conventional standards, including shear strength standards, for example, well known to those skilled in the art; and the positions of lower surfaces 38 and 40 are accordingly determined. The angle $\lambda$ of dovetail base surface 46 with respect to the engine centerline can be zero; however, for obtaining a relatively smooth rotor spool, $\lambda$ is preferably approximately equal to angle $\phi$ of the angular orientation of platform 26.

FIG. 3 illustrates a booster or pre-compressor section of a multistage turbomachine rotor assembly of an axial flow gas turbine engine having tilted blades and employing skew dovetails. Turbine intake air 10 is compressed as it passes through the compressor stages, or rows of blading 20 and stator vanes 21, which are four in number in this instance, and are exhausted at 47.

The compressor rotor assembly comprises a generally cylindrical, hollow, thin rotor spool or drum 48 defining a radially inner flowpath surface or boundary indicated generally at 50, and having an end flange 52 which is mounted for rotation on a turbine drive shaft or related rotating members such as the fan rotor (not shown). A disk web 54 is provided for increasing the rotor spool stiffness or rigidity for predeterminedly controlling rotor system frequency. A radially outer, sloping flowpath surface or boundary 56 surrounds rotor spool 48 and blades 20, and supports stator vanes 21.

The rotor spool 48 includes blade supporting structure comprising spaced, thickened, annular portions 58 which extend circumferentially therearound. Each annular portion 58 comprises a blade-retaining dovetail shaped slot or groove 60 extending circumferentially therein, which slot 60 comprises a radially inward, wide undercut portion 62 which extends upwardly into a relatively narrow neck portion 64, which diverges outwardly to and adjacent platforms 26 of blades 20 and slidably receives with a tight fit the roots or dovetails 22 of the plurality of blades 20. Each slot 60 of rotor spool 48 thus comprises a complementary groove for mating with a corresponding skew dovetail as shown in FIG. 2.

Inasmuch as the slope of rotor spool 48 and outer boundary 56 varies along the centerline of the turbomachine assembly, the angular orientation $\alpha$ of airfoils 24 of blades 20 of the various stages varies from stage-to-stage for allowing the flow streamlines to impinge airfoils 24 at a substantially normal angle thereto.

Platforms 26 form part of the inner flowpath surface 50 and are generally aligned parallel to the turbine fluid flow streamlines and to the contour of rotor spool 48 for providing a relatively smooth aerodynamic contour. The angle $\phi$ of platform 26 is accordingly approximately equal to the angle $\alpha$ of airfoil 24.

Inasmuch as the angular orientation $\lambda$ of base 46 of skew dovetail 22 is approximately equal to the angular orientation $\phi$ of platform 26 and both approximately parallel to the contour of rotor spool 48 and to the compressor fluid flow streamlines, fluid seal portions 16 on both sides of blades 20 are accordingly approximately equal in length. The fluid seal portions 16 are also short in length due to the compact arrangement of asymmetric dovetail teeth pairs 34 and 36, thereby minimizing the weight of rotor spool 48. Additionally, this arrangement completely eliminates transitional corners 18 of rotor spool 48. This results in a rotor spool 48 of lighter weight than a conventional rotor of the type shown in FIG. 1 and a rotor spool which requires less machining to manufacture. Additionally, by using skew dovetail 22, a smaller and lighter dovetail can be used in the turbomachine rotor assembly 1 and still provide adequate retention of blades 20 in rotor spool 48.

More specifically, the use of a skew dovetail and rotor spool design in accordance with this invention results in a more mechanically efficient structure. It will be apparent to those skilled in the art after having considered this invention that by radially spacing the oppositely extending dovetail teeth, bending moments applied to the airfoils 24 are more effectively accommodated by the skew dovetail teeth. The reaction forces, and the contact forces associated therewith, required for retaining blade 20 in rotor spool 48 will be less in magnitude than those required when symmetric laterally aligned dovetail teeth are utilized. This is due to the fact that for a given applied bending moment, the magnitudes of the individual force components of a reaction force couple decrease as the distance between the individual forces increases. By radially displacing the dovetail teeth of skew dovetail 22, the distance between the reaction forces associated therewith is increased resulting in decreased components of reaction forces for balancing the applied bending moment caused by the rotation of a tilted blade 20.

Accordingly, because the skew dovetail 22 is more mechanically efficient than a conventional symmetric dovetail, a smaller and lighter weight dovetail for a given application can be used. As the forces required for retaining skew dovetail 22 are decreased, the support structure 58 containing blade-retaining groove 60 in rotor spool 48 can be made thinner for accommodating these forces which results in a ligher weight rotor spool.

Inasmuch as the skew dovetail design is effective for reducing the bending component of contact forces, the contact forces on a pair of dovetail teeth are more equalized at a non-zero value and accordingly, any possibility of dovetail teeth chatter is reduced thereby increasing the high cycle fatigue strength of skew dovetail 22.

Another advantage realized from using an asymmetric skew dovetail is the avoidance of placing a blade in an inappropriate stage of the turbomachine during assembly. More specifically, since the tilt of the blades is generally different for each stage, the configuration of the skew dovetail associated therewith is correspondingly also predeterminedly different. In this way the blades of different turbomachine stages are different and therefore are not interchangeable between stages. Accordingly, the misassembly of blades in a rotor spool is inherently avoided by the use of skew dovetails.

While there has been described herein what is considered to be a preferred embodiment of the invention, other modifications will occur to those skilled in the art after having considered the present disclosure. For example, it is to be understood that the skew circumferential dovetail arrangement of the present invention can be used in either or both the turbine and compressor sections of turbomachine engines. Accordingly, it is desired to secure by the appended claims all modifications falling within the true spirit and scope of the invention.

We claim:

1. A turbomachine rotor assembly having blade mounting means comprising:
    a rotor spool defining a predetermined flowpath surface and having at least one circumferential dovetail-shaped retaining groove therein;
    a plurality of radially extending blade members each comprising a root portion positioned in said retaining groove and having a pair of axially oppositely extending asymmetric shoulders having radially outwardly facing and radially spaced contact surfaces; and
    said retaining groove of said rotor spool having radially inwardly facing contact surfaces for engaging said radially outwardly facing contact surfaces of said root portion.

2. A turbomachine rotor assembly according to claim 1, wherein each of said blade members further comprises an airfoil portion, a central longitudinal axis of which extends at a predetermined angle relative to a radial axis of said rotor spool so that said airfoil portion is tilted with respect to said radial axis.

3. A turbomachine rotor assembly according to claim 1, wherein said contact surfaces of said pair of shoulders of said root portion are oppositely sloped and are oriented at approximately 45 degrees to the radial axis of said rotor spool.

4. A turbomachine rotor assembly according to claim 1, wherein said blade members each further comprises a substantially rectangular platform integral with and positioned intermediate the airfoil of said blade member and said root portion thereof, and said root portion further comprises a base surface aligned substantially parallel to both said platform and said flowpath surface of said rotor spool.

5. A turbomachine blade having an airfoil portion, and an integral root portion for being positioned in a substantially complementary circumferential dovetail shaped blade-retaining groove in the periphery of a turbomachine rotor spool, wherein said root portion comprises a pair of asymmetric shoulders extending axially and oppositely in the direction of leading and trailing edges of said airfoil portion, and said shoulders having radially outwardly facing and radially displaced contact surfaces for engaging cooperating radially inwardly facing contact surfaces in said retaining groove.

6. A turbomachine blade according to claim 5, wherein a central longitudinal axis of said airfoil portion of said blade extends at a predetermined angle relative to a longitudinal axis of said root portion so that said airfoil portion is tilted with respect to a radial axis when mounted in said rotor spool.

7. A turbomachine blade according to claim 5, wherein said contact surfaces of said pair of shoulders of said root portion are oppositely sloped and are oriented at approximately 45 degrees to the longitudinal axis of said root portion.

8. A turbomachine blade according to claim 5, wherein said blade further comprises a substantially rectangular platform integral with and positioned intermediate the airfoil portion of said blade and said root portion thereof, and said root portion further comprises a base surface aligned substantially parallel to said platform.

9. A turbomachine rotor assembly according to claim 1 wherein said dovetail-shaped retaining groove is defined by an undercut portion in said rotor spool that extends radially outwardly to a narrower neck portion and defines therebetween said radially inwardly facing contact surfaces.

10. A turbomachine rotor assembly according to claim 1, wherein said contact surfaces of said pair of shoulders of said root portion are oppositely sloped and are oriented at approximately 40 to approximately 55 degrees to the radial axis of said rotor spool.

11. A turbomachine rotor assembly according to claim 2 wherein said root portion further comprises a laterally necked-in portion extending radially inwardly from said airfoil portion and flaring laterally outwardly and radially inwardly for defining said radially outwardly facing contact surfaces of said pair of asymmetric shoulders.

12. A turbomachine blade according to claim 5 wherein said root portion further comprises a laterally necked-in portion extending radially inwardly form said airfoil portion and flaring laterally outwardly and radially inwardly for defining said radially outwardly facing contact surfaces of said pair of asymmetric shoulders.

13. A turbomachine rotor assembly according to claim 2 wherein a first one of said pair of shoulders of said root portion is located on that side of said airfoil portion which is tilted axially away from said radial axis and is predeterminedly radially spaced inwardly relative to a second one of said pair of shoulders.

14. A turbomachine blade according to claim 5 wherein said airfoil portion is tilted with respect to said root portion and wherein a first one of said pair of shoulders of said root portion is located one that side of said airfoil portion in the direction of tilt and is predeterminedly radially spaced inwardly relative to a second one of said pair of shoulders.

* * * * *

UNITED STATES PATENT AND TRADEMARK OFFICE
CERTIFICATE OF CORRECTION

PATENT NO. : 4,460,315
DATED : July 17, 1984
INVENTOR(S) : Wu-Yang Tseng and Bruno G. Lampsat It is certified that error appears in the above-identified patent and that said Letters Patent is hereby corrected as shown below:

Column 8, line 43 (claim 12), the word "form" should read --from--.

Signed and Sealed this

Fifteenth Day of October 1985

[SEAL]

Attest:

Attesting Officer

DONALD J. QUIGG

Commissioner of Patents and Trademarks—Designate

UNITED STATES PATENT AND TRADEMARK OFFICE
CERTIFICATE OF CORRECTION

PATENT NO. : 4,460,315
DATED : July 17, 1984
INVENTOR(S) : Wu-Yang Tseng, Bruno G. Lampsat It is certified that error appears in the above-identified patent and that said Letters Patent is hereby corrected as shown below:

Column 1, lines 46 and 47, delete "Ser. No. 13DV-7749" and insert therefor --U.S. Patent 4,433,955--. --.

Signed and Sealed this

Nineteenth Day of November 1985

[SEAL]

Attest:

DONALD J. QUIGG

Attesting Officer

Commissioner of Patents and Trademarks